United States Patent
Tsuchiya et al.

(10) Patent No.: US 9,490,670 B2
(45) Date of Patent: Nov. 8, 2016

(54) ROTOR AND MOTOR

(71) Applicant: ASMO CO., LTD., Shizuoka-ken (JP)

(72) Inventors: Takahiro Tsuchiya, Toyohashi (JP); Chie Morita, Kosai (JP); Yoji Yamada, Hamamatsu (JP); Koji Mikami, Kosai (JP)

(73) Assignee: Asmo Co., Ltd., Shizuoka-ken (JP)

(*) Notice: Subject to any disclaimer, the term of this patent is extended or adjusted under 35 U.S.C. 154(b) by 132 days.

(21) Appl. No.: 14/495,492

(22) Filed: Sep. 24, 2014

(65) Prior Publication Data

US 2015/0084466 A1    Mar. 26, 2015

(30) Foreign Application Priority Data

Sep. 26, 2013   (JP) .................................. 2013199737
Feb. 10, 2014   (JP) .................................. 2014023177
Mar. 6, 2014    (JP) .................................. 2014044140
Aug. 4, 2014    (JP) .................................. 2014158746

(51) Int. Cl.

| H02K 1/24  | (2006.01) |
| H02K 21/16 | (2006.01) |
| H02K 21/04 | (2006.01) |
| H02K 1/27  | (2006.01) |

(52) U.S. Cl.
CPC ............ H02K 1/243 (2013.01); H02K 1/2733 (2013.01); H02K 21/16 (2013.01); *H02K 1/2713* (2013.01); *H02K 21/044* (2013.01)

(58) Field of Classification Search
CPC ... H02K 1/243; H02K 1/2713; H02K 21/044
See application file for complete search history.

(56) References Cited

U.S. PATENT DOCUMENTS 5,258,735 A * 11/1993 Allwine, Jr. ............. G01B 7/30
                                                    335/302
6,229,239 B1 * 5/2001 Lucidarme ........... H02K 1/2706
                                                    310/156.53
7,288,862 B2 * 10/2007 Song ...................... H02K 33/16
                                                    310/12.24
2013/0121856 A1    5/2013 Yamada et al.
2013/0300242 A1   11/2013 Yamada et al.
2014/0049132 A1 *  2/2014 Yamada ............... H02K 1/2706
                                                    310/156.66

FOREIGN PATENT DOCUMENTS

| JP | 2012115085 | 6/2012  |
| JP | 2013118801 | 6/2013  |
| JP | 2013212036 | 10/2013 |

OTHER PUBLICATIONS

Translation of JP 2013-118801, Yamada et al., Jun. 13, 2013, pp. 1-7.*

* cited by examiner

*Primary Examiner* — Dang Le
(74) *Attorney, Agent, or Firm* — Patterson Thuente Pedersen, P.A.

(57) ABSTRACT

A rotor includes first and second rotor cores, a disk magnet, and a rectifying magnet. The first and second rotor cores each include a core base and claw-poles. The disk magnet is magnetized in the axial direction so that the claw-poles of the first rotor core function as first poles and the claw-poles of the second rotor core function as second poles. The rectifying magnet includes at least an inter-pole magnet portion or a back-surface magnet portion. The inter-pole magnet portion is located in a gap formed in the circumferential direction between the claw-poles of the first rotor core and the claw-poles of the second rotor core. The back surface magnet portion is located in a gap formed at back surfaces of the claw-poles. The rectifying magnet and the disk magnet are formed from different materials. The rectifying magnet is integrated with the disk magnet in a post-process.

15 Claims, 15 Drawing Sheets

ROTOR AND MOTOR

RELATED APPLICATIONS

This application claims benefit of priority of Japanese Application No. 2013-199737, filed Sep. 26, 2013, Japanese Application No. 2014-023177, filed Feb. 10, 2014, Japanese Application No. 2014-044140, filed Mar. 6, 2014, and Japanese Application No. 2014-158746, filed Aug. 4, 2014, said applications being hereby fully incorporated herein by reference.

BACKGROUND OF THE INVENTION

The present invention relates to a rotor and a motor.

In the prior art, a rotor having a so-called Lundell type structure that is magnetized by a permanent magnet is known as a rotor used for a motor (e.g., refer to Japanese Laid-Open Patent Publication No. 2013-118801). The rotor includes first and second rotor cores, which are combined with each other, and a disk magnet (field magnet), which is arranged between the rotor cores. The first and second rotor cores each include claw-poles in the circumferential direction. The disk magnet functions so that the claw-poles that are adjacent to each other in the circumferential direction are different magnetic poles.

The rotor of Japanese Laid-Open Patent Publication No. 2013-118801 includes an auxiliary magnet (back surface magnet) that is arranged on the back surface of each claw-pole and an auxiliary magnet (claw-pole) that is located between claw-poles in the circumferential direction. In the rotor, all of the magnets, including the auxiliary magnets and the disk magnet, are integrally molded in advance so that the number of components can be kept low.

In the above motor, the magnets are all integrated so that the number of components can be kept low. However, in a magnet that is integrally molded in advance, it is difficult to adjust the magnetic flux in each portion.

SUMMARY OF THE INVENTION

It is an object of the present invention to provide a rotor and a motor that facilitates the adjustment of the magnetic flux while keeping the number of components low.

To achieve the above object, one aspect of the present invention is a rotor including first and second rotor cores, a disk magnet, and a rectifying magnet. The first and second rotor cores each include a generally disk-shaped core base and a plurality of claw-poles. The claw-poles are arranged at equal intervals on an outer circumference of the core base. Each of the claw-poles projects toward an outer side in a radial direction and extend in an axial direction. The core bases of the first and second rotor cores are opposed to each other, and the claw-poles of the first and second rotor cores are alternately arranged in a circumferential direction. The disk magnet is arranged between the core bases in the axial direction. The disk magnet is magnetized in the axial direction so that the claw-poles of the first rotor core function as first poles and the claw-poles of the second rotor core function as second poles. The rectifying magnet includes at least one of an inter-pole magnet portion and a back-surface magnet portion. The inter-pole magnet portion is located in a gap formed in the circumferential direction between the claw-poles of the first rotor core and the claw-poles of the second rotor core. The back surface magnet portion is located in a gap formed at back surfaces of the claw-poles. The rectifying magnet and the disk magnet are formed from different materials. The rectifying magnet is integrated with the disk magnet in a post-process.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of a motor will now be described.

Figure 1:
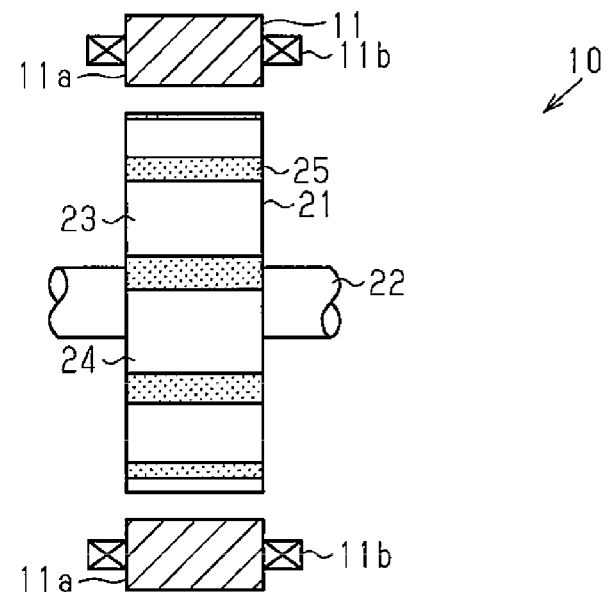
FIG. 1 is a schematic diagram of a motor according to a first embodiment of the present invention.

As shown in FIG. 1, the motor 10 of the present embodiment includes a stator 11 and a rotor 21, which is arranged opposing the stator 11 inside the stator 11 and is rotatably supported.

The stator 11 includes a stator core 11a and windings 11b, which are wound around the teeth of the stator core 11a. When the windings 11b are supplied with drive current, the stator 11 generates a rotational magnetic field that rotates the rotor 21.

Figure 4:
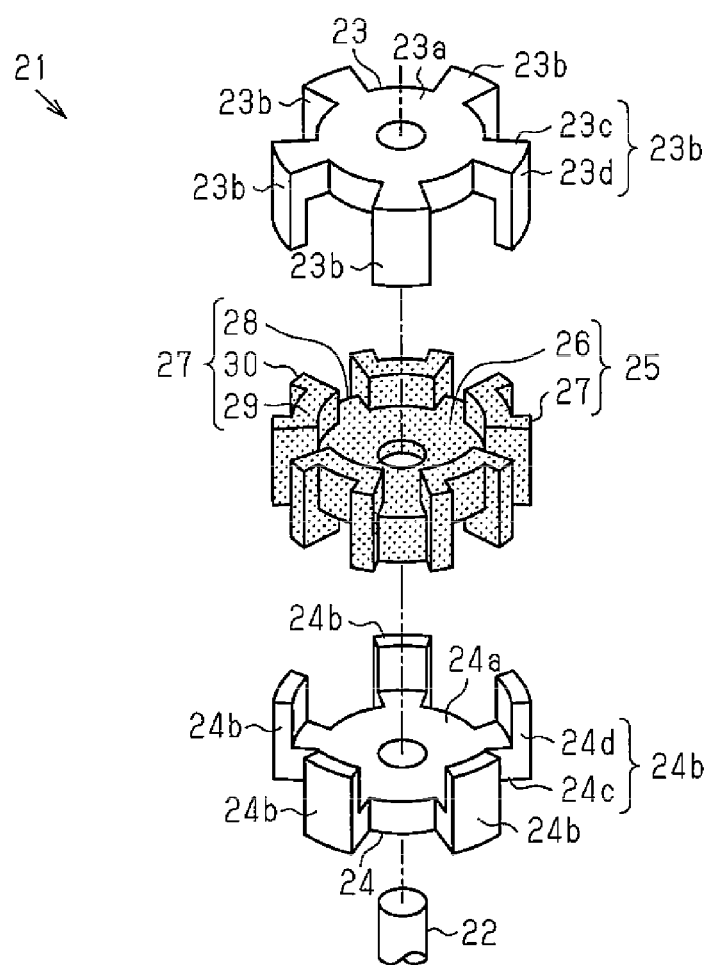
FIG. 4 is an exploded perspective view showing the components of the rotor of FIG. 1.

As shown in FIGS. 1 and 4, the rotor 21 includes two rotor cores 23 and 24, which are fixed to a rotation shaft 22, and an integrated magnet 25, which is located between the two rotor cores 23 and 24. A rotation shaft 22 is press-fitted into the rotor cores 23 and 24 to maintain the axial distance between the rotor cores 23 and 24.

The rotor core 23 includes a generally disk-shaped core base 23a and a plurality of (five in the present embodiment) claw-poles 23b arranged at equal intervals on the outer circumference of the core base 23a. Each of the claw-poles 23b projects toward the outer side in the radial direction and extends in the axial direction. In detail, each claw-pole 23b includes a projection 23c, which projects toward the outer side in the radial direction from the outer circumference of the core base 23a, and a claw 23d, which is located on the distal end of the projection 23c and extended in the axial direction. The projection 23c has a sectoral shape as viewed in the axial direction. The claw 23d has a sectoral cross-section in the direction orthogonal to the axis.

Figure 3:
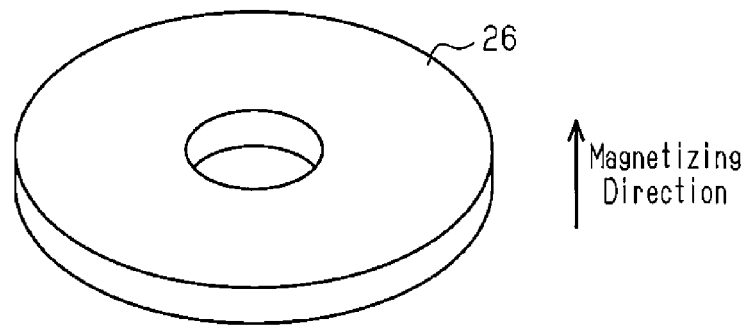
FIG. 3 is a perspective view of a disk magnet for the rotor of FIG. 1 that forms an integrated magnet.

As shown in FIGS. 3 and 4, the rotor cores 24 is shaped identically to the rotor core 23 and includes a generally disk-shaped core base 24a and a plurality of claw-poles 24b arranged at equal intervals on the outer circumference of the core base 24a. Each of the claw-poles 24b projects toward the outer side in the radial direction and extends in the axial direction. In detail, each claw-pole 24b includes a projection 24c, which projects toward the outer side in the radial direction from the outer circumference of the core base 24a, and a claw 24d, which is located on the distal end of the projection 24c and extended in the axial direction. Like the projection 23c of the rotor core 23, the projection 24c has a sectoral shape as viewed in the axial direction. The claw 24d has a sectoral cross-section in the direction orthogonal to the axis. Further, the claws 24d of the rotor core 24 are longer in the axial direction than the claws 23d of the rotor core 23. The rotor core 23 corresponds to a first rotor core, and the rotor core 24 corresponds to a second rotor core.

Each of the rotor cores 23 and 24 includes a central bore into which the rotation shaft 22 is press-fitted. The rotor cores 23 and 24 are fixed to the rotation shaft 22 to set the distance between the axially outer sides (sides facing away from each other) of the rotor cores 23 and 24 to a distance that is set in advance. The rotor core 24 is coupled to the rotor core 23 so that the claw-poles 24b are located between adjacent ones of the claw-poles 23b in the rotor core 23 and so that the integrated magnet 25 is arranged (sandwiched) between the core base 23a and the core base 24a.

The integrated magnet 25 includes a disk magnet 26 and a rectifying magnet 27, which are integrated with each other. The rectifying magnet 27 is integrated with the disk magnet 26 in a post-process of adhering or the like. The disk magnet 26 is formed from a material that differs from that of the rectifying magnet 27.

As shown in FIG. 3, the disk magnet 26 is annular and includes a central bore.

The disk magnet 26 is magnetized in the axial direction to have the claw-poles 23b of the rotor core 23 function as first poles (N poles in the present embodiment) and the claw-poles 24b of the rotor core 24 function as second poles (S poles in the present embodiment). In this manner, the rotor 21 of the present embodiment is a rotor having the so-called Lundell-type structure that uses the disk magnet 26. In the rotor 21, five claw-poles 23b, which function as N poles, and five claw-poles 24b, which function as S poles, are alternately arranged in the circumferential direction. The number of poles of the rotor 21 is ten (number of pole pairs is five).

The disk magnet 26 is, for example, an anisotropic sintered magnet and formed by, for example, a ferrite magnet, a samarium-cobalt (SmCo) magnet, a neodymium magnet, or the like.

Figure 2:
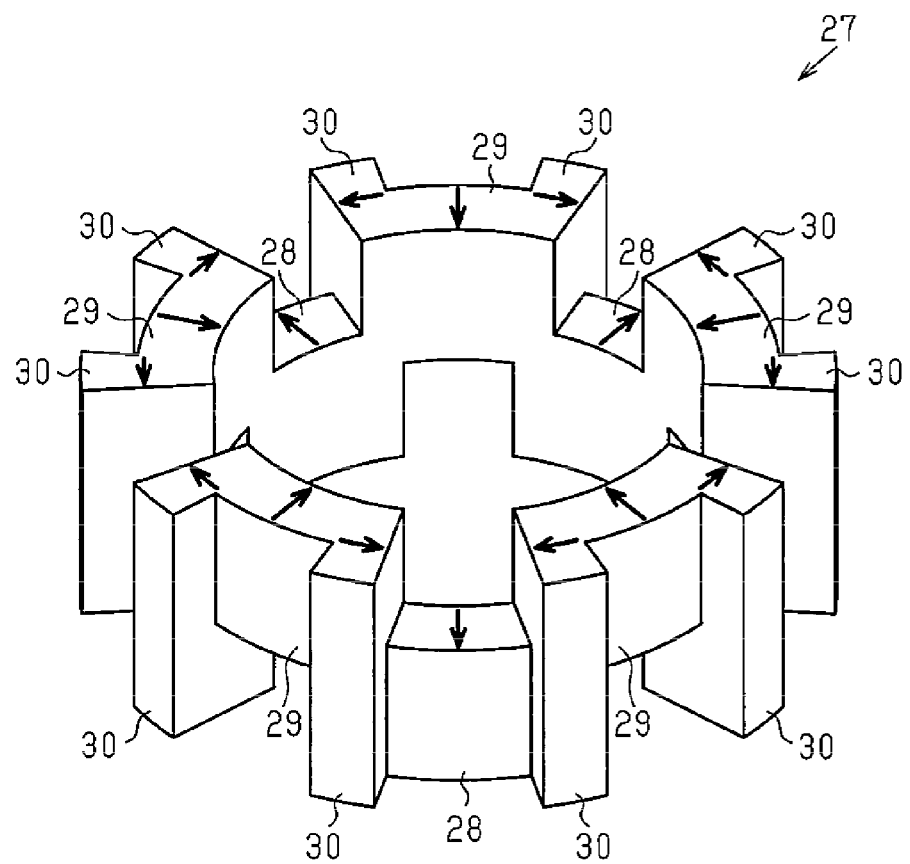
FIG. 2 is a perspective view of a rectifying magnet for the rotor of FIG. 1 that forms an integrated magnet.
Figure 5:
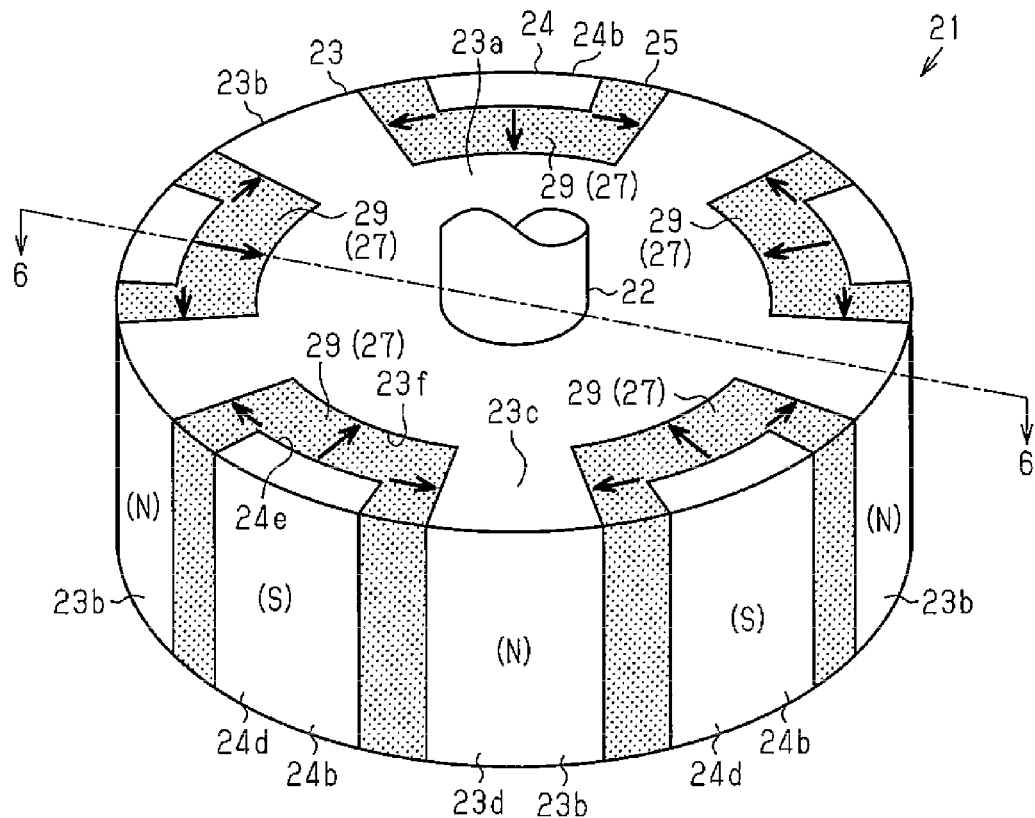
FIG. 5 is a perspective view of the rotor of FIG. 4.
Figure 6:
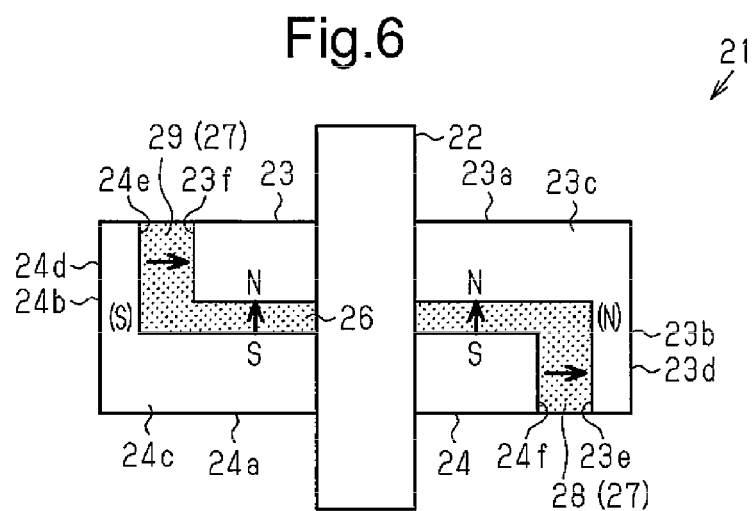
FIG. 6 is a cross-sectional view of the rotor taken along line 6-6 in FIG. 5.

As shown in FIGS. 2, 5, and 6, the rectifying magnet 27 includes back surface magnet portions 28 and 29 and inter-pole magnet portions 30. The rectifying magnet 27 is, for example, a bond magnet (plastic magnet, rubber magnet, or the like) and formed by, for example, a ferrite magnet, a samarium-iron nitride (SmFeN) magnet, a samarium-cobalt (SMCo) magnet, a neodymium magnet, or the like.

As shown in FIGS. 5 and 6, the back surface magnet portions 28 and 29 are located between a back surface 23e (inner surface in radial direction) of each claw-pole 23b of the rotor core 23 and an outer circumferential surface 24f of the core base 24a in the rotor core 24 and between a back surface 24e of each claw-pole 24b of the rotor core 24 and an outer circumferential surface 23f of the core base 23a in the rotor core 23.

Each back surface magnet portion 28 is magnetized so that the side in contact with the back surface 23e of the claw-pole 23b is an N pole, which is the same pole as the claw-pole 23b, and the side in contact with the outer circumferential surface 24f of the core base 24a in the rotor core 24 is an S pole, which is the same pole as the core base 24a.

Each back surface magnet portion 29 is magnetized so that the side in contact with the back surface 24e of the claw-pole 24b is an S pole, and the side in contact with the outer circumferential surface 23f of the core base 23a in the rotor core 23 is an N pole.

The inter-pole magnet portions 30 are located between the claw-poles 23b and the claw-poles 24b in the circumferential direction. Each inter-pole magnet portion 30 is magnetized so that the side of the claw-pole 24b of the rotor core 24 in the circumferential direction is the S pole, and the side of the claw-pole 23b in the rotor core 23 is the N pole.

The operation of the motor of the first embodiment will now be described.

When the windings 11b are supplied with drive current, the motor 10 of the present embodiment generates a rotational magnetic field with the stator 11 that rotates and drives the rotor 21.

In the rotor 21 of the present embodiment, the rectifying magnet 27 and the disk magnet 26 are formed from different materials. Thus, the magnetic flux can be easily adjusted as compared with when forming the rectifying magnet 27 and the disk magnet 26 from the same material. Further, the rectifying magnet 27 and the disk magnet 26 are integrated with each other in a post-process. This keeps the number of components low. Further, the rectifying magnet 27 includes the inter-pole magnet portions 30 and the back surface magnet portions 28 and 29. This increases the amount of magnetic flux of the rotor 21 and rectifies the magnetic flux of the disk magnet 26 as compared to when the rectifying magnet 27 includes only the inter-pole magnet portions 30 or only the back surface magnet portions 28 and 29. In this manner, the present invention contributes to improvement of the output of the rotor 21.

The first embodiment has the advantages described below.

(1) The rectifying magnet 27 and the disk magnet 26 are formed from different materials. This facilitates the adjustment of magnetic flux at each portion and enables output adjustment. Further, the disk magnet 26 and the rectifying magnet 27 are integrated in a post process. This keeps the number of components low.

(2) Further, the rectifying magnet 27 is a bond magnet. A bond magnet has a higher dimensional accuracy and a higher degree of freedom in shape than a sintered magnet. Thus, even though the back surface magnet portions 28 and 29 and the inter-pole magnet portions 30 are both included in the rectifying magnet 27 and cause the rectifying magnet 27 to have a complicated shape, the rectifying magnet 27 can be easily manufactured.

(3) The disk magnet 26, which has the claw-poles 23b and 24b act as the poles, is formed by a sintered magnet that has relatively strong magnetic flux. This further ensures that the claw-poles 23b and 24b are magnetized and act as poles.

The first embodiment may be modified as described below.

Figure 7:
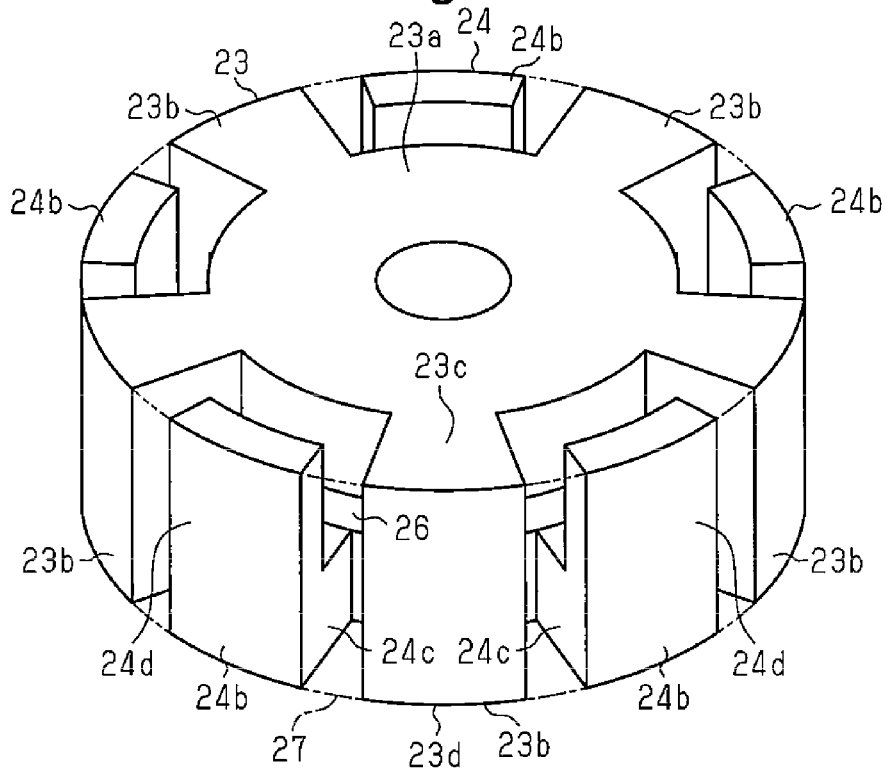
FIG. 7 is a perspective view illustrating a molding method of an integrated magnet in a further example of the first embodiment.

In the above embodiment, the integrated magnet 25 is integrated by adhering the rectifying magnet 27 and the disk magnet 26. Instead, for example, the integrated magnet 25 may be formed by insert-molding the rectifying magnet 27 with the disk magnet 26 held between the rotor cores 23 and 24 as shown in FIG. 7. This structure also integrates the rectifying magnet 27 with the disk magnet 26 in a post-process. By insert-molding the rectifying magnet 27, the rectifying magnet 27 and the disk magnet 26 may be integrated while molding the rectifying magnet 27. Further, the rectifying magnet 27 is directly molded with the disk magnet 26 and the rotor cores 23 and 24. This limits, for example, the formation of an adhesive layer or a mechanical air gap between the rectifying magnet 27 and each of the rotor cores 23 and 24. As a result, the permeance of the rotor 21 is improved, and the torque of the rotor 21 can be obtained.

Figure 8:
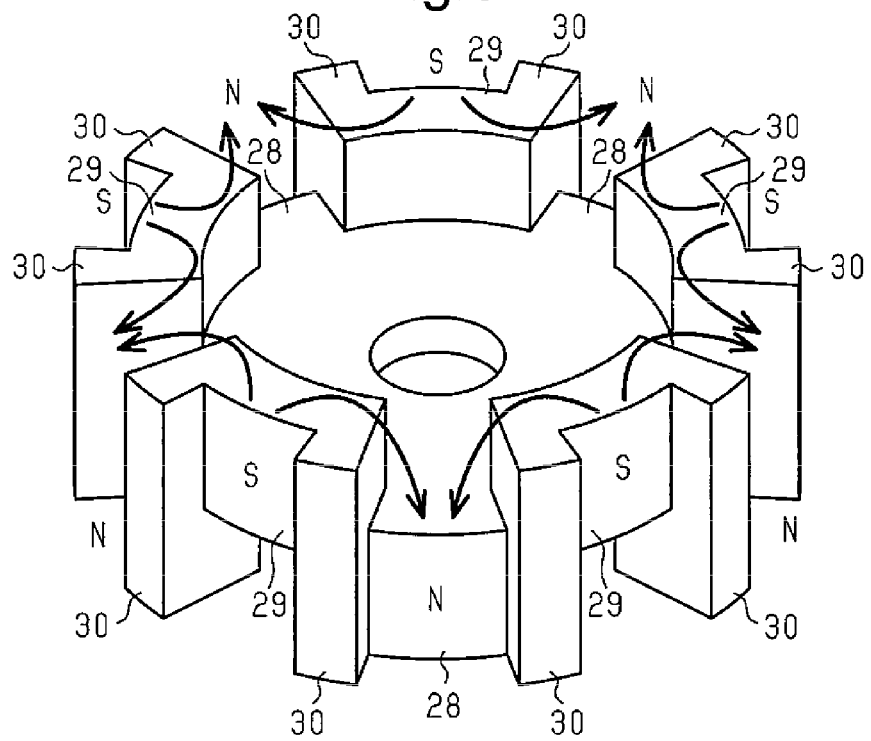
FIG. 8 is a perspective view of the integrated magnet in the further example of FIG. 7.

Like the integrated magnet 25 shown in FIG. 8, the magnetizing (orientation direction) of the rectifying magnet 27, which functions in a supplemental manner for the disk magnet 26 that generates the main magnetic flux, may be polar anisotropic orientation. More specifically, the integrated magnet 25 is subject to polar anisotropic orientation magnetization in which magnetic flux flows in a manner curved bulging toward the inner side in the radial direction from the outer surfaces of the S pole back surface magnet portions 29 via the adjacent inter-pole magnet portions 30 toward the outer surfaces of N pole back surface magnet portions 28. As a result, the back surface magnet portions 28 and 29 include magnetic flux of radial direction components, and the inter-pole magnet 30 includes magnetic flux of circumferential direction components. Thus, the integrated magnet 25 shown in FIG. 8 functions in the same manner as the integrated magnet 25 of the above embodiment, and the back surface magnet portions 28 and 29 and the inter-pole magnet portions 30 may be magnetized to include components of the optimal direction.

In the above embodiment, the rectifying magnet 27 includes the inter-pole magnet portions 30 and the back surface magnet portions 28 and 29 but may include only the inter-pole magnet portions 30 or only the back surface magnet portions 28 and 29.

In the above embodiment, the rotor 21 is a rotor including ten poles, that is, five claw-poles 23b and five claw-poles 24b. However, the number of poles may be changed.

In the above embodiment, the rotor 21 includes ten inter-pole magnet portions 30 and a total of ten back surface magnet portions 28 and 29. Instead, the number of the inter-pole magnet portions 30 and the number of the back surface magnet portions 28 and 29 may be changed in accordance with the number of the claw-poles 23b and 24b.

In the above embodiment, the disk magnet 26 is a sintered magnet, and the rectifying magnet 27 is a bond magnet. However, the materials of the magnets are not limited in such a manner.

The materials of the disk magnet 26 and the rectifying magnet 27 are not limited to those described in the above embodiment and may be changed as long as the disk magnet 26 and the rectifying magnet 27 are formed from different materials.

The above embodiment and the modified examples may be used in combination.

A second embodiment of a motor will now be described with reference to FIGS. 9 to 13.

Figure 9:
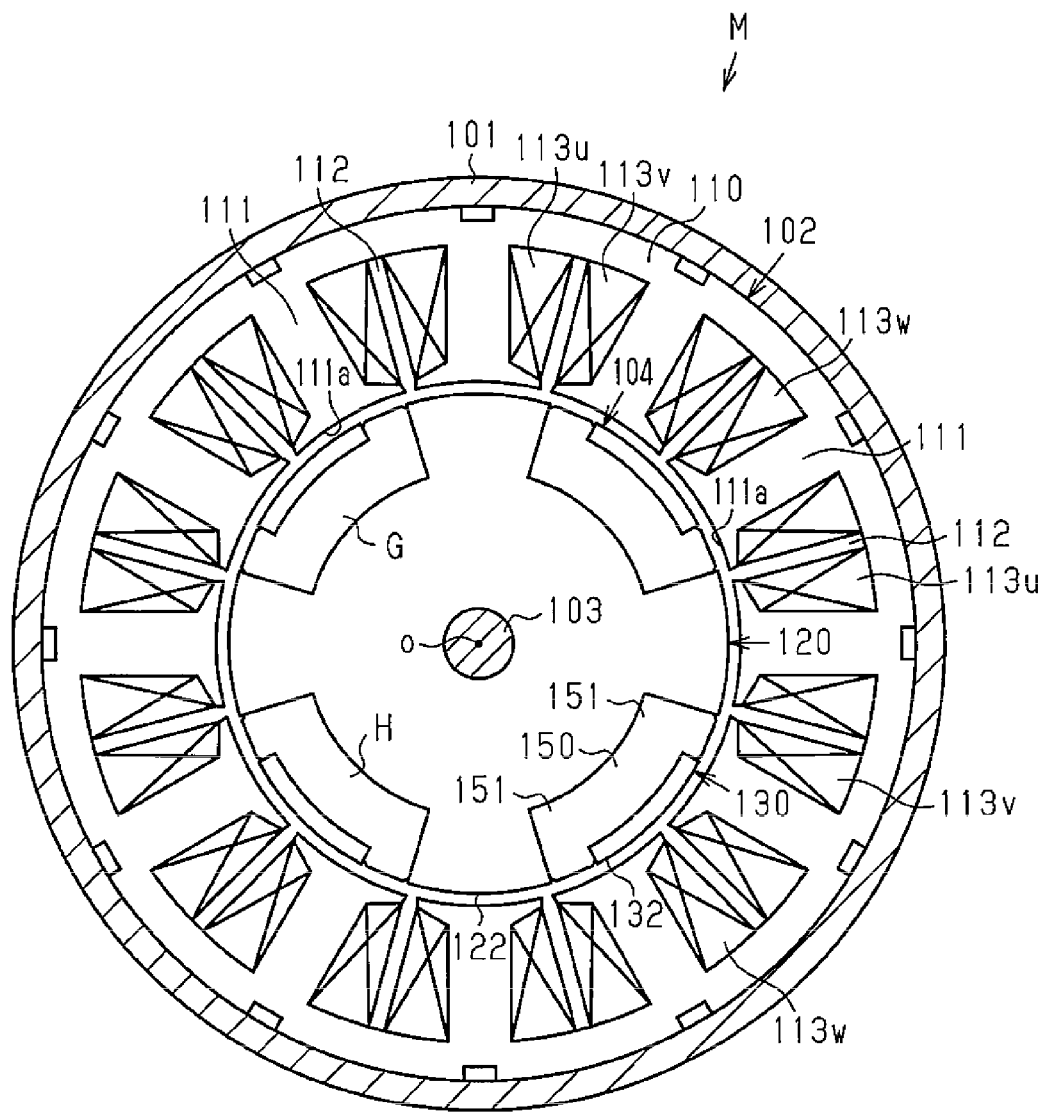
FIG. 9 is a partially cross-sectional view of a motor according to a second embodiment of the present invention.

FIG. 9 shows a brushless motor M, which serves as a motor. A stator 102 is fixed to an inner circumferential surface of a motor housing 101. A rotor 104 having a so-called Lundell type structure is fixed to a rotation shaft 103 in the stator 102 and rotated integrally with the rotation shaft 103. The rotation shaft 103 is a non-magnetic stainless steel shaft and supported by a bearing (not shown) in the motor housing 101 to be rotatable relative to the motor housing 101.

The stator 102 includes a cylindrical stator core 110. The outer circumferential surface of the stator core 110 is fixed to the inner surface of the motor housing 101. Teeth 111 are arranged at equal pitches in the circumferential direction at the inner side of the stator core 110. Each tooth 111 extends in the axial direction and toward the inner side in the radial direction. Each tooth 111 is a T-shaped tooth with an inner side in the radial direction defining an inner circumferential surface 111a obtained from a locus taken along a concentric arc, the center of which is the center axis O of the rotation shaft 103, extended in the axial direction.

Slots 112 are formed between the teeth 111 in the circumferential direction. In the present embodiment, the number of the teeth 111 is twelve, and the number of the slots 112 is twelve, which is the same as the teeth 111. Windings for three phases, namely, a U-phase winding 113u, a V-phase winding 113v, and a W-phase winding 113w are sequentially wound in the circumferential direction as concentrated windings around the twelve teeth 111. The windings 113u, 113v, and 113w are arranged in the slots 112.

Three-phase power voltage is applied to the phase windings 113u, 113v, and 113w to generate a rotational magnetic field in the stator 102 and rotate the rotor 104 fixed to the rotation shaft 103, which is located at the inner side of the stator 102.

Figure 10:
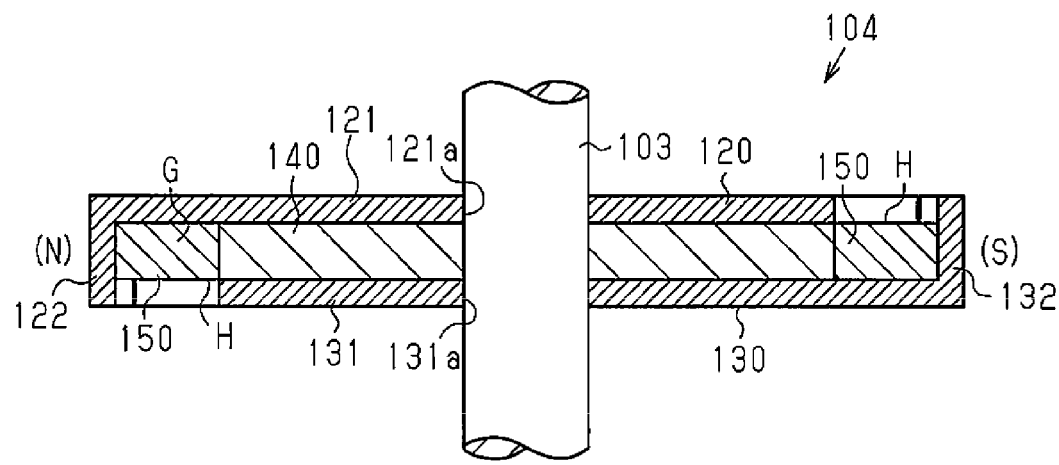
FIG. 10 is a partially cross-sectional view of the rotor of FIG. 9.
Figure 11:
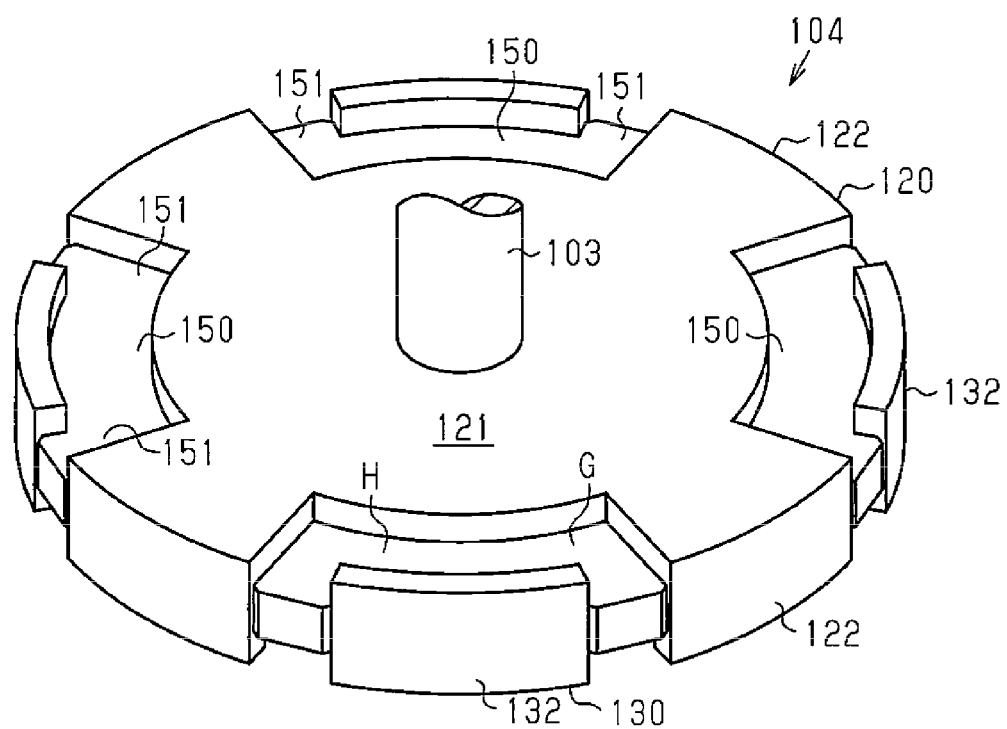
FIG. 11 is a perspective view of a rotor shown in FIG. 10.
Figure 12:
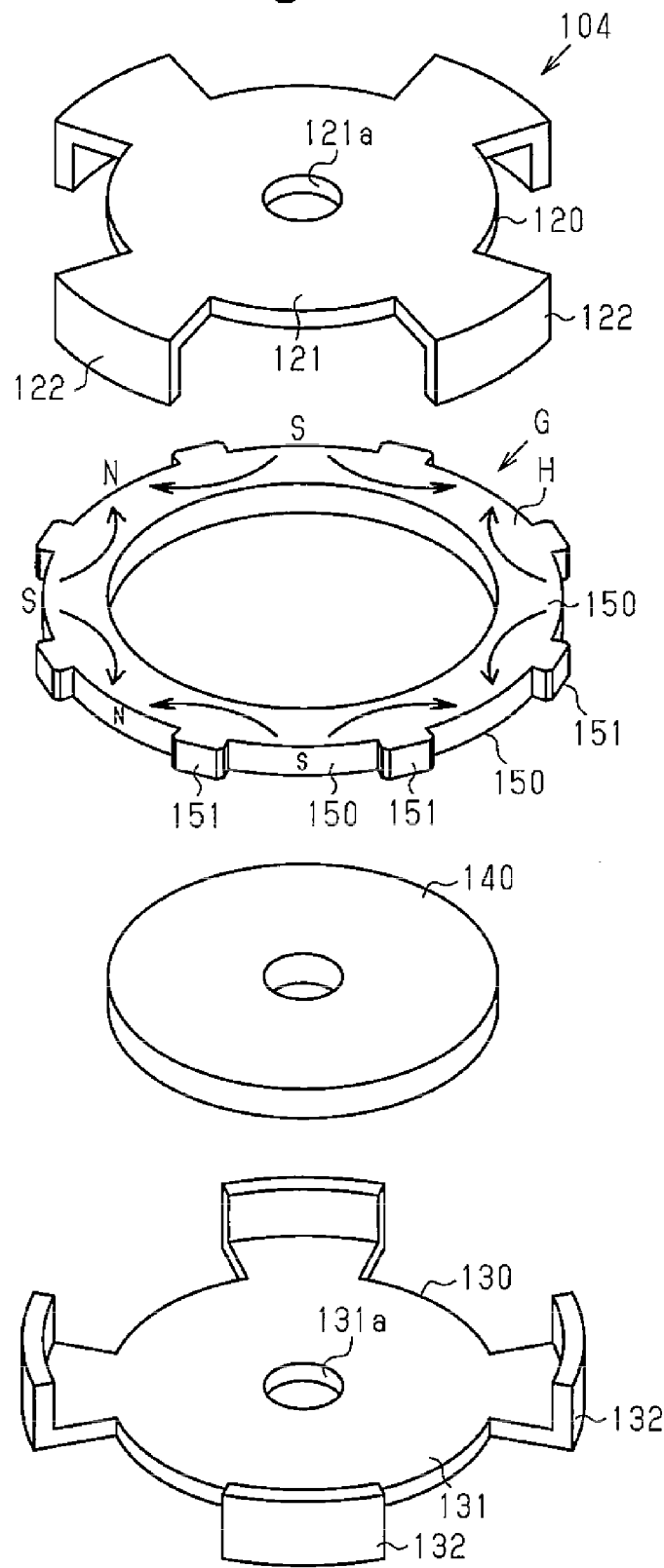
FIG. 12 is an exploded perspective view of the rotor of FIG. 11.

As shown in FIGS. 10 to 12, the rotor 104 includes first and second rotor cores 120 and 130, a disk magnet 140, and a rectifying magnet G.

The first rotor core 120 is formed from a soft magnetic material, in the present embodiment, from a sheet of magnetic steel. The first rotor core 120 includes a generally disk-shaped first core base 121 having a central bore 121a into which the rotation shaft 103 is press-fitted. A plurality of (four in the present embodiment) of first claw-poles 122 are arranged at equal intervals on the outer circumference of the first core base 121. Each of the first claw-poles 122 projects toward the outer side in the radial direction and extends in the axial direction.

The second rotor core 130 is formed from the same material and has the same shape as the first rotor core 120. The second rotor core 130 includes a generally disk-shaped second core base 131 having a central bore 131a into which the rotation shaft 103 is press-fitted. A plurality of (four in the present embodiment) of second claw-poles 132 are arranged at equal intervals on the outer circumference of the second core base 131. Each of the second claw-poles 132 projects toward the outer side in the radial direction and extends in the axial direction.

The first and second rotor cores 120 and 130 are fixed to the rotation shaft 103 by press-fitting the rotation shaft 103 into the central bores 121a and 131a. The second rotor core 130 is coupled to the first rotor core 120 so that the second claw-poles 132 are located between adjacent ones of the first claw-poles 122 and so that the disk magnet 140 is arranged (sandwiched) between the first core base 121 and the second core base 131 in the axial direction.

As shown in FIG. 10, the disk magnet 140, which is a generally disk-shaped permanent magnet including a central bore, is magnetized in the axial direction to have the first claw-poles 122 function as first poles (N poles in the present embodiment) and the second claw-poles 132 function as second poles (S poles in the present embodiment). In this manner, the rotor 104 of the present embodiment is a rotor having the so-called Lundell-type structure. In the rotor 104, four first claw-poles 122, which function as N poles, and four second claw-poles 132, which function as S poles, are alternately arranged in the circumferential direction. The number of poles of the rotor 104 is set to eight (number of pole pairs is four). Thus, in the present embodiment, the number of poles (pole number) of the rotor 104 is set to eight, and the number of teeth 111 (slots 112) of the stator 102 is set to twelve.

The rectifying magnet G and the disk magnet 140 are formed from different materials. The rectifying magnet G is integrated with the disk magnet 140 in a post-process. The rectifying magnet G includes back surface magnet portions 150 and inter-pole magnet portions 151 that are integrated with one another. In detail, the back surface magnet portions 150 are located at the inner side in the radial direction (back surfaces) of the first and second claw-poles 122 and 132 as viewed from the axial direction and between the disk magnet 140 and the first and second claw-poles 122 and 132. The back surface magnet portions 150 are magnetized to reduce leakage (short-circuiting) flux at where the back surface magnet portions 150 are located. Further, the inter-pole magnet portions 151 are located between the first and second claw-poles 122 and 132 as viewed from the axial direction. The inter-pole magnet portions 151 are magnetized to reduce leakage flux at where the inter-pole magnet portions 151 are located. In other words, the inter-pole magnet portions 151 are formed to connect adjacent ones of the back surface magnet portions 150 as viewed in the axial direction. That is, the inter-pole magnet portions 151 are alternately arranged with the back surface magnet portions 150. Thus, the rectifying magnet G is formed to be annular. The inter-pole magnet portions 151 are shaped to project toward the outer side in the radial direction from the back surface magnet portions 150 to be located between the portions (distal portions) of the first and second claw-poles 122 and 132 extending in the axial direction.

The back surface magnet portions 150 and the inter-pole magnet portions 151 are integrally formed in an annular manner so that the axial end surfaces of the back surface magnet portions 150 and the axial end surfaces of the inter-pole magnet portions 151 form a single flat surface H. If the back surface magnet portions 150 and the inter-pole magnet portions 151 were to be arranged so that the rotor 104 would be generally shaped as a solid cylinder and have no gaps, the rectifying magnet G would be shaped to include projections and recesses in the axial direction. In the present embodiment, the axial end surfaces form the single flat surface H so that projections are not formed. In other words, the rectifying magnet G (back surface magnet portions 150 and inter-pole magnet portions 151) is formed to have a uniform thickness except in a range in the axial direction where the first core base 121 and the second core base 131 are arranged.

Figure 13:
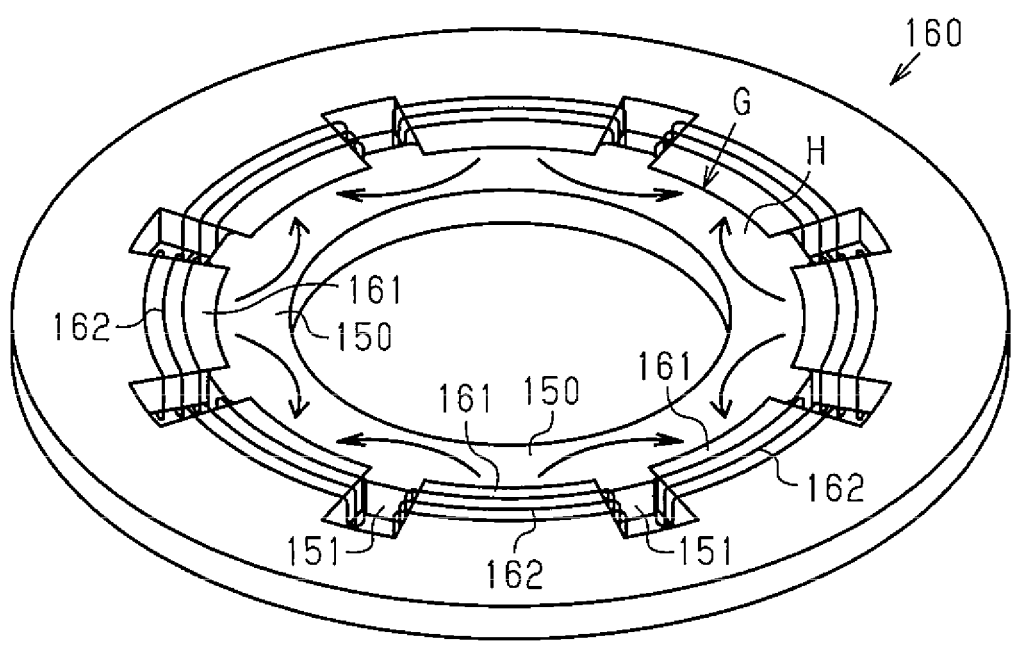
FIG. 13 is a perspective view of a magnetizing device used to manufacture a rectifying magnet shown in FIG. 12.
Figure 14:
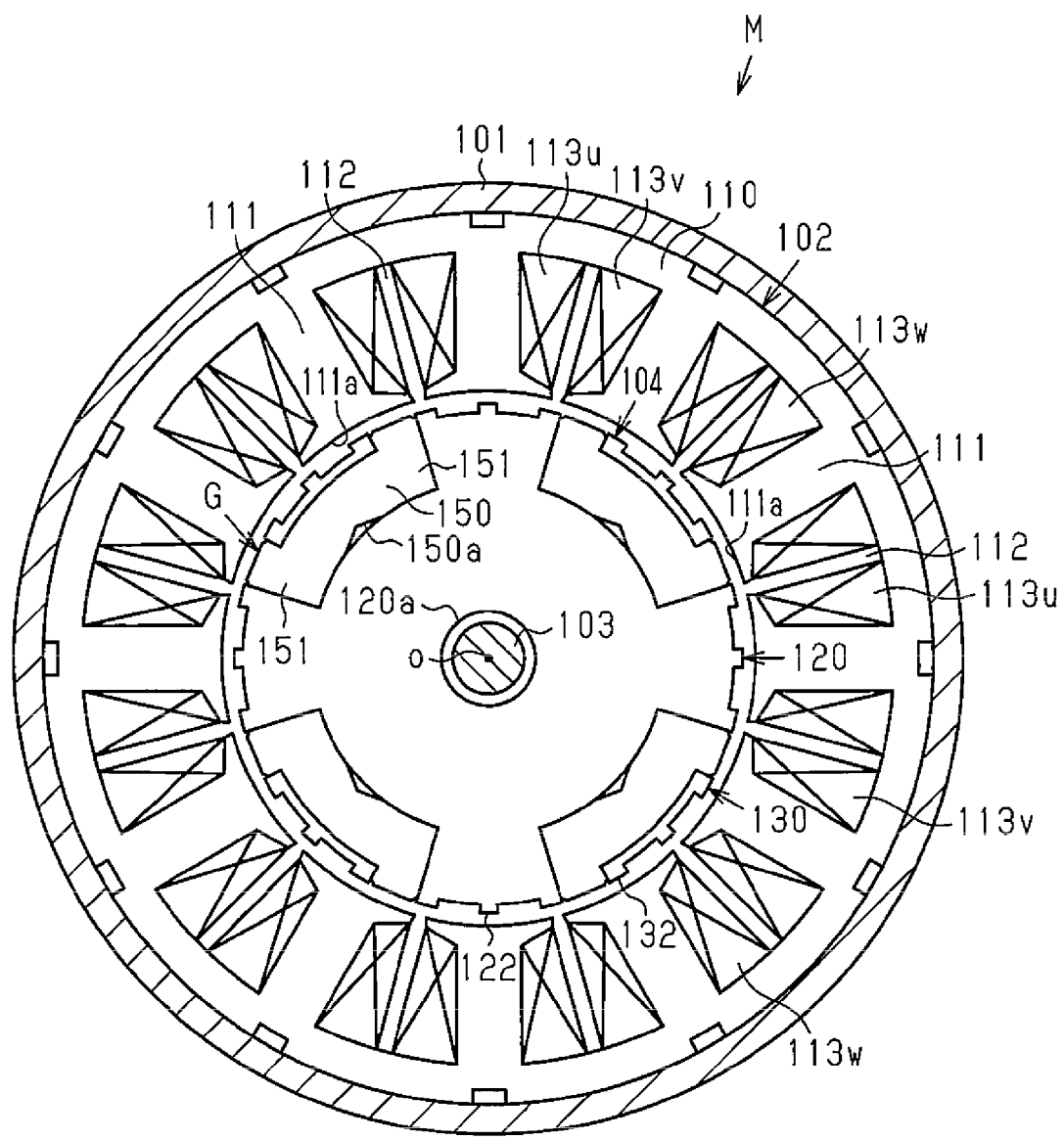
FIG. 14 is a partially cross-sectional view of a motor according to a third embodiment of the present invention.
Figure 15:
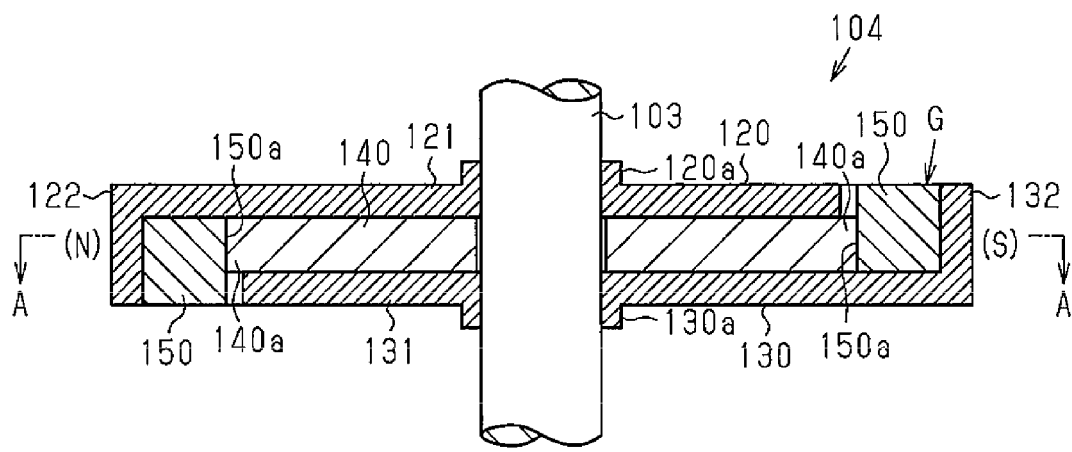
FIG. 15 is a partially cross-sectional view of a rotor shown in FIG. 14.
Figure 16:
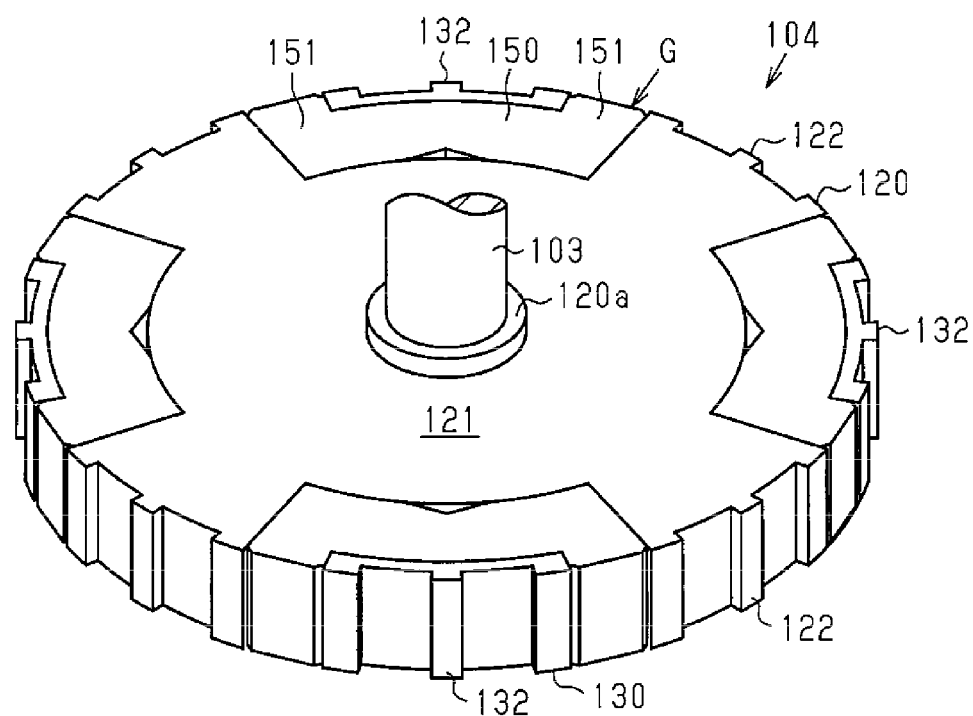
FIG. 16 is a perspective view of the rotor of FIG. 15.
Figure 17:
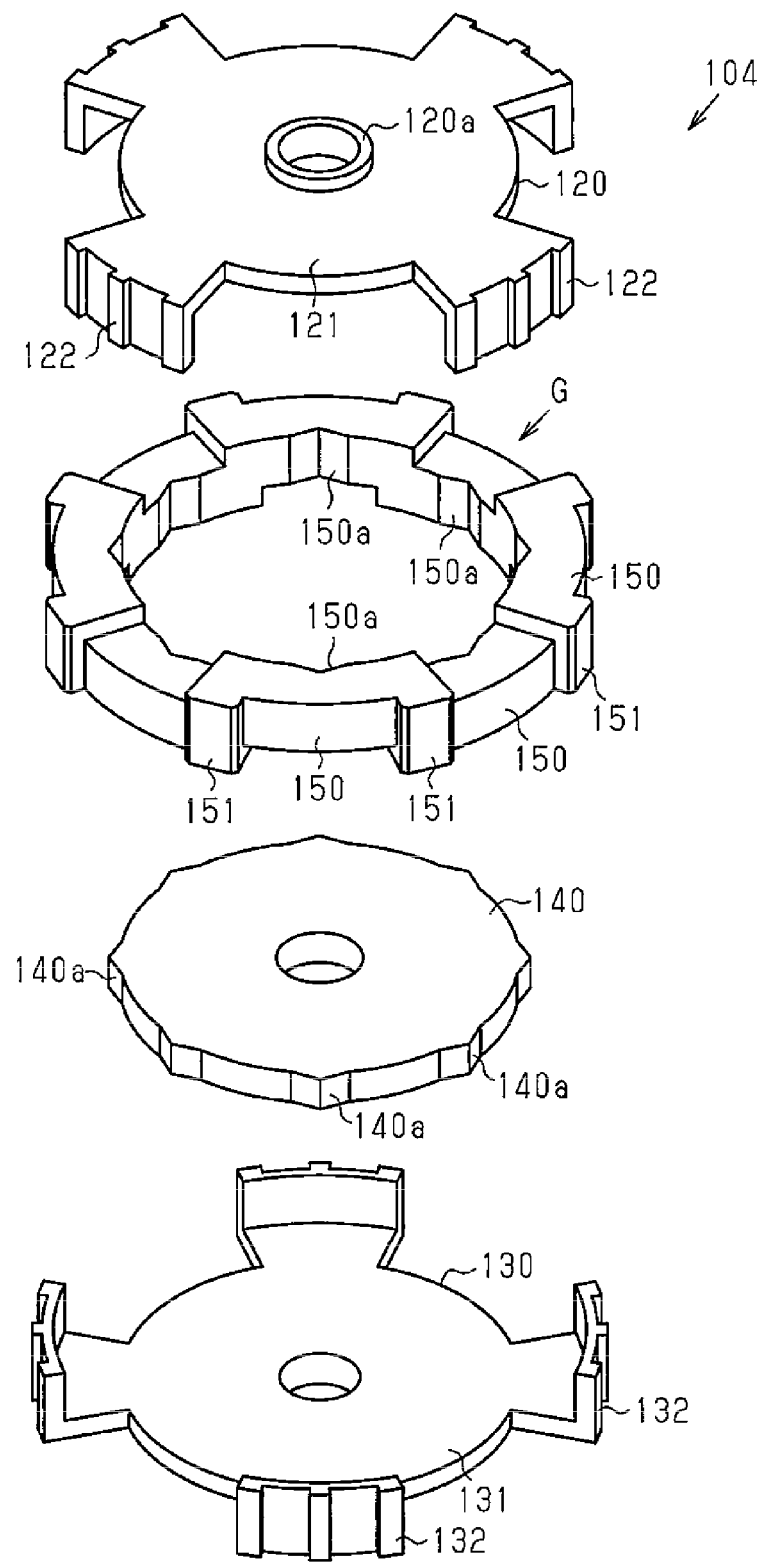
FIG. 17 is an exploded perspective view of the rotor of FIG. 16.

The rectifying magnet G is a polar anisotropic magnet and oriented as schematically shown by the arrows in FIGS. 12 and 13. This magnetizes the rectifying magnet G to reduce leakage flux in the back surface magnet portions 150 and in the inter-pole magnet portions 151.

For example, as shown in FIG. 13, a magnetizing device 160, which is used to manufacture the rectifying magnet G, includes magnetizing core portions 161, which extend toward the inner side in the radial direction to be located near the outer circumference of the portions that form the back surface magnet portions 150, and coils 162, which are wound around the magnetizing cores 161. Adjacent ones of the coils 162 in the circumferential direction are supplied with large currents in opposite directions to manufacture the rectifying magnet G.

The operation of the motor M will now be described.

Three-phase power voltage is applied to the phase windings 113u, 113v, and 113w of the stator core 110 to generate a rotational magnetic field in the stator 102. The rotational magnetic field rotates and drives the rotor 104 fixed to the rotation shaft 103, which is located at the inner side of the stator 102.

In this case, the back surface magnet portions 150 in the rectifying magnet G reduces leakage flux (in the radial direction) at portions of the rotor 104 where the back surface magnet portions 150 are located. Further, the inter-pole magnet portions 151 in the rectifying magnet G reduce leakage flux (in the circumferential direction) at portions where the inter-pole magnet portions 151 are located. Thus, the rotor 104 is rotated and driven when acting with the rotational magnetic field of the stator 102 with high efficiency.

The second embodiment has the following advantage.

(4) The rectifying magnet G includes the back surface magnet portions 150 and the inter-pole magnet portions 151 that are formed integrally in an annular manner. The axial end surfaces of the back surface magnet portions 150 and the axial end surfaces of the inter-pole magnet portions 151 form the single flat surface H. That is, the rectifying magnet G does not include projections and recesses in the axial direction. Thus, magnetization for reducing the leakage flux may be facilitated while reducing the number of components. In other words, during magnetization, there is no need for three-dimensional magnetization including the axial direction. Thus, for example, as shown in FIG. 13, magnetization may easily be performed just by arranging the magnetizing core portions 161 near the outer circumferential surface of the portions that form the back surface magnet portions 150. Further, the rectifying magnet G does not include projections and recesses in the axial direction. This facilitates the molding of the rectifying magnet G. Additionally, if the back surface magnet portions 150 were separate from the inter-pole magnet portions 151, they may be chipped when coupled together. Such a situation may be avoided. Moreover, if the back surface magnet portions 150 were separate from the inter-pole magnet portions 151, the fastening strength may be low, and these portions may be scattered (separated) by centrifugal force when rotated. Such a situation may be limited.

The second embodiment may be modified as described below.

Although not particularly mentioned in the above embodiment, the materials and manufacturing methods of the disk magnet 140 and the rectifying magnet G are not particularly limited and various magnets may be used. For example, a ferrite magnet, a samarium-iron nitride magnet, a samarium-cobalt magnet, a neodymium magnet, or an alnico magnet may be used. Further, for example, a sintered magnet or a bond magnet may be used. When using a bond magnet, the bond magnet may be compression-molded or injection molded.

In the above embodiment, the present invention is embodied in the motor M in which the number of poles of the rotor 104 is set to eight and the number of the teeth 111 of the stator 102 is set to twelve. However, the number of poles of the rotor 104 and the number of the teeth 111 of the stator 102 may be changed. For example, the present invention may be embodied in a motor in which the number of poles of the rotor 104 is set to ten, and the number of the teeth 111 of the stator 102 is set to twelve.

A third embodiment of a brushless motor M, which serves as a motor, will now be described with reference to FIGS. 14 to 18.

The motor of the third embodiment has the same structure as the second embodiment. In the description hereafter, same reference numerals are given to those components that are the same as the corresponding components of the motor in the second embodiment. Such components will not be described.

The first rotor core 120 is formed from a soft magnetic material, in the present embodiment, from a sheet of magnetic steel. Further, the first rotor core 120 includes a generally disk-shaped first core base 121 having a boss 120a into which the rotation shaft 103 is press-fitted.

The second rotor core 130 is formed from the same material and has the same shape as the first rotor core 120. Further, the second rotor core 130 includes a generally disk-shaped second core base 131 having a boss 130a into which the rotation shaft 103 is press-fitted.

Figure 18:
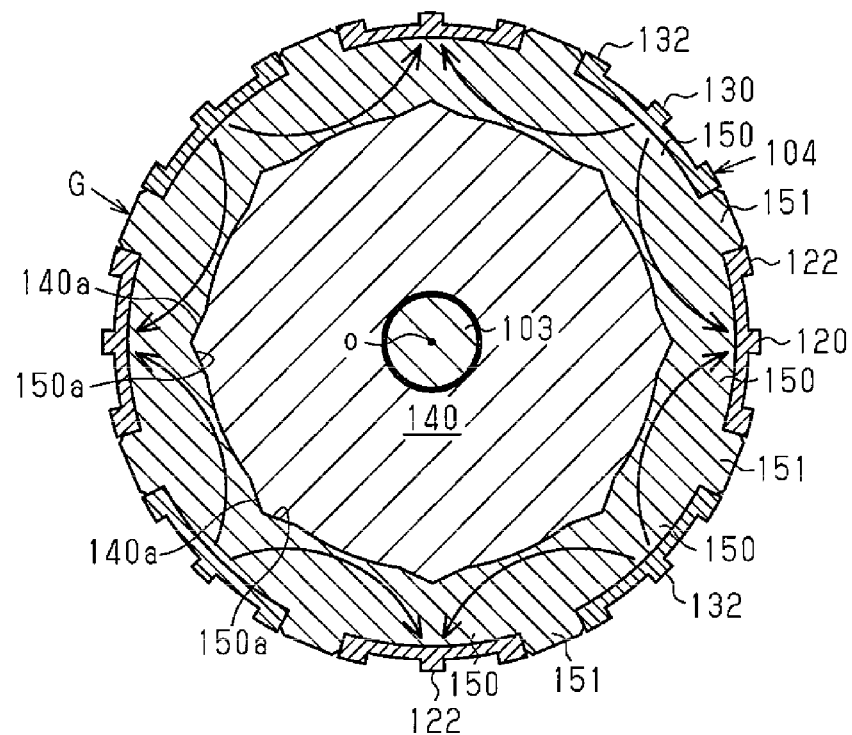
FIG. 18 is a cross-sectional view taken along line A-A in FIG. 15.

In the third embodiment, the rectifying magnet G is oriented as schematically shown by the arrows in FIG. 18 from the outer circumferential surface of a back surface magnet portion 150 to the outer circumferential surface of an adjacent back surface magnet portions 150 in the circumferential direction. This magnetizes the rectifying magnet G to reduce leakage flux in the back surface magnet portions 150 and in the inter-pole magnet portions 151. The rectifying magnet G is magnetized by supplying a large current to the coil located near the outer circumferential surface of each back surface magnet portion 150.

The inner surface at the circumferentially central section of the back surface magnet portion 150 includes a recessed portion 150a. The recessed portion 150a of the present embodiment is formed to be deeper as the circumferential center of the back surface magnet portion 150 becomes closer (with respect to a concentric circle of which the center is the center axis O of the rotation shaft 103). In detail, the recessed portion 150a of the present embodiment is formed in only the circumferentially central section of the back surface magnet portion 150, and the remaining inner surface of the rectifying magnet G is formed to have an arcuate shape concentric to a circle of which the center is the center axis O of the rotation shaft 103. The recessed portion 150a is formed by two flat surfaces that become further outward in the radial direction as the circumferential center of the back surface magnet portion 150 becomes closer.

The disk magnet 140 includes projected portions 140a that enter the recessed portions 150a. The projected portions 140a of the present embodiment are formed to have the same shape as the recessed portions 150a (shape allowing for fitting without any gaps).

The third embodiment has the advantages described below.

(5) The inner surface of the circumferentially central section of the back surface magnet portion 150 in the rectifying magnet G includes the recessed portion 150a. This reduces the amount of the magnet that would be substantially unnecessary. The rectifying magnet G that reduces leakage flux in the above structure is oriented from an outer circumferential surface of a back surface magnet portion 150 to the outer circumferential surface of an adjacent back surface magnet portion 150. In other words, the inner surface of the circumferentially central section of the back surface magnet portion 150 is substantially irrelevant to the orientation. Thus, the formation of the recessed portion 150a in this portion allows for reduction in the amount of the magnet that would be substantially unnecessary. Further, the disk magnet 140 includes the projected portions 140a that enter the recessed portions 150a. Thus, in comparison with a disk magnet 140 that does not include the projected portions 140a, for example, the amount of the disk magnet 140 can be increased. As a result, the output can be increased without changing the size of the rotor 104. Further, for example, the projected portions 140a enter the recessed portions 150a and restrict rotation of the disk magnet 140.

(6) The recessed portion 150a is set to be deeper as the circumferentially central section becomes closer. This allows for reduction in the amount of the magnet that would be substantially unnecessary. That is, the rectifying magnet G that reduces the leakage flux is irrelevant to the orientation as the center of the inner surface portion of the back surface magnet portion 150 becomes closer. This allows for reduction in the amount of the magnet that would be substantially unnecessary.

(7) The projected portions 140a of the disk magnet 140 are formed to have the same shape as the recessed portions 150a. This allows unnecessary gaps to be eliminated and increases the output.

The third embodiment may be modified as described below.

Figure 19:
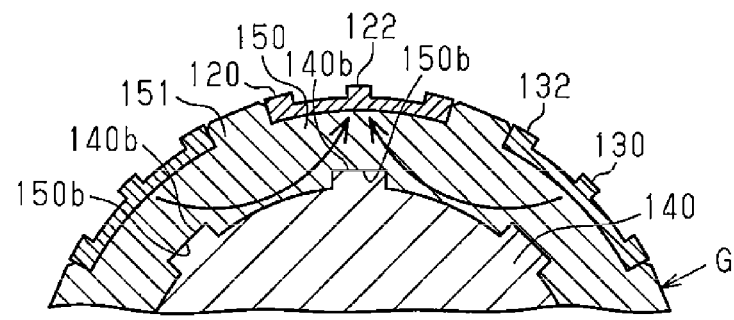
FIG. 19 is a partially cross-sectional view of a rotor in a further example of the third embodiment.

In the above embodiment, the recessed portion 150a is formed by two flat surfaces to be deeper as the circumferential center of the back surface magnet portion 150 becomes closer (relative to a concentric circle of which the center is the center axis O of the rotation shaft 103). The recessed portion 150a is not limited to such a shape, and the shape may be changed. Further, the projected portion 140a of the disk magnet 140 may be changed in accordance with the shape of the recessed portion. For example, as shown in FIG. 19, the recessed portion 150a may be changed to a recessed portion 150b that is rectangular as viewed in the axial direction. In this example, a projected portion 140b of the disk magnet 140 is formed to have the same shape as the recessed portion 150b (shape allowing for fitting without any gaps).

Figure 20:
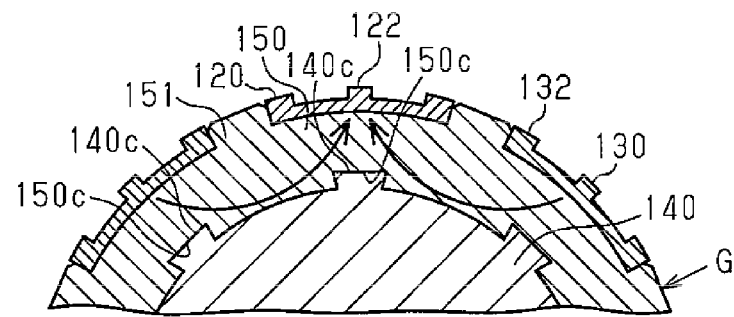
FIG. 20 is a partially cross-sectional view of a rotor in a further example of the third embodiment.

For example, as shown in FIG. 20, the recessed portion 150a may be changed to a recessed portion 150c that is trapezoidal as viewed in the axial direction. In this example, a projected portion 140c of the disk magnet 140 is formed to have the same shape as the recessed portion 150c (shape allowing for fitting without any gaps).

Figure 21:
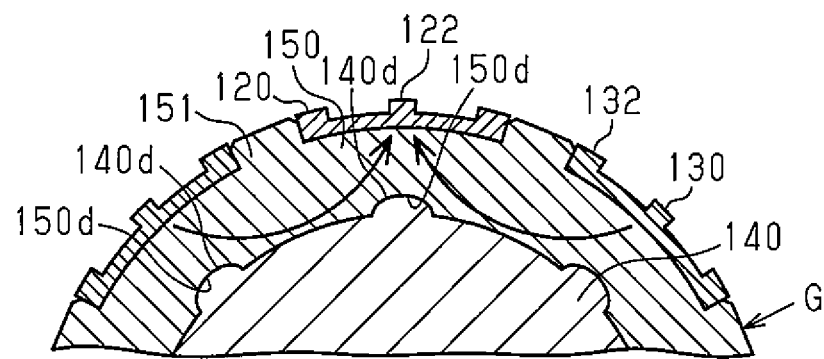
FIG. 21 is a partially cross-sectional view of a rotor in the further example of the third embodiment.

For example, as shown in FIG. 21, the recessed portion 150a may be changed to a recessed portion 150d having a curved shape as viewed in the axial direction. In this example, a projected portion 140d of the disk magnet 140 is formed to have the same shape as the recessed portion 150d (shape allowing for fitting without any gaps).

Figure 22:
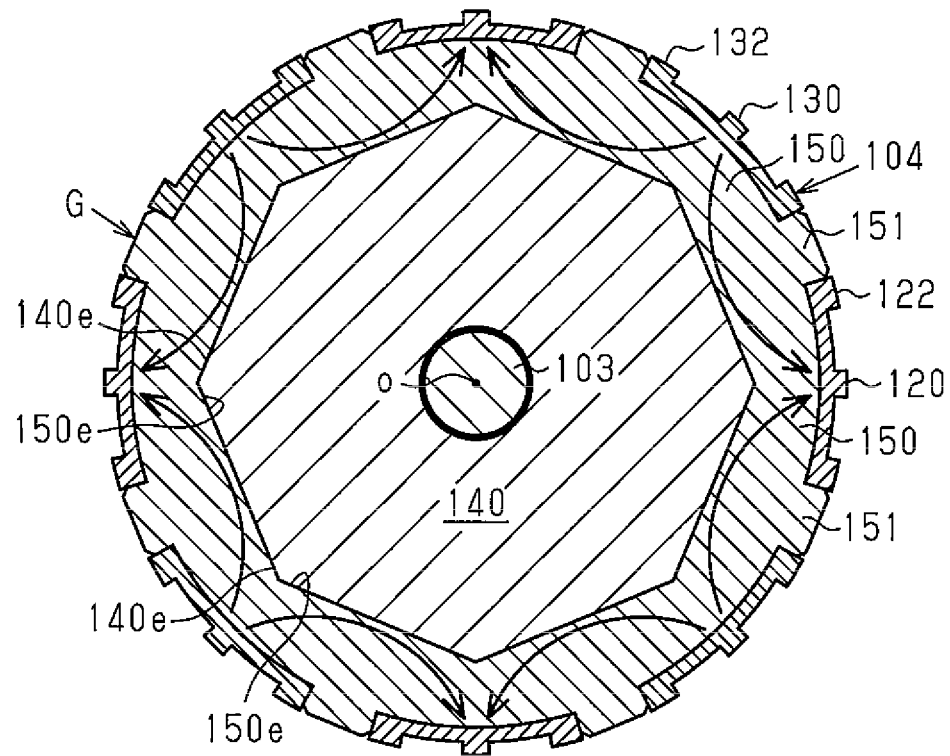
FIG. 22 is a partially cross-sectional view of a rotor in a further example of the third embodiment.

For example, as shown in FIG. 22, the recessed portion 150a may be changed to a recessed portion 150e formed when the rectifying magnet G has a polygonal inner surface as viewed in the axial direction. In this example, a projected portion 140e of the disk magnet 140 is formed to have the same shape as the recessed portion 150e (shape allowing for fitting without any gaps). More specifically, in the structure of FIG. 22, the disk magnet 140 is entirely formed to be polygonal as viewed from the axial direction. In this case, the rectifying magnet G and the disk magnet 140 may have simple shapes. This facilitates, for example, designing and manufacturing.

In the above embodiment, the inner surface of the rectifying magnet G excluding the recessed portions 150a are arcuate and concentric to a circle of which the center is the center axis O of the rotation shaft 103. However, there is no limit to such a shape. For example, the inner surface of the inter-pole magnet portion 151 may include an inwardly projected portion. In this case, the disk magnet may include an inwardly recessed portion having the same shape as the inwardly projected portion (shape allowing for fitting of inwardly projected portion without any gaps).

Figure 23:
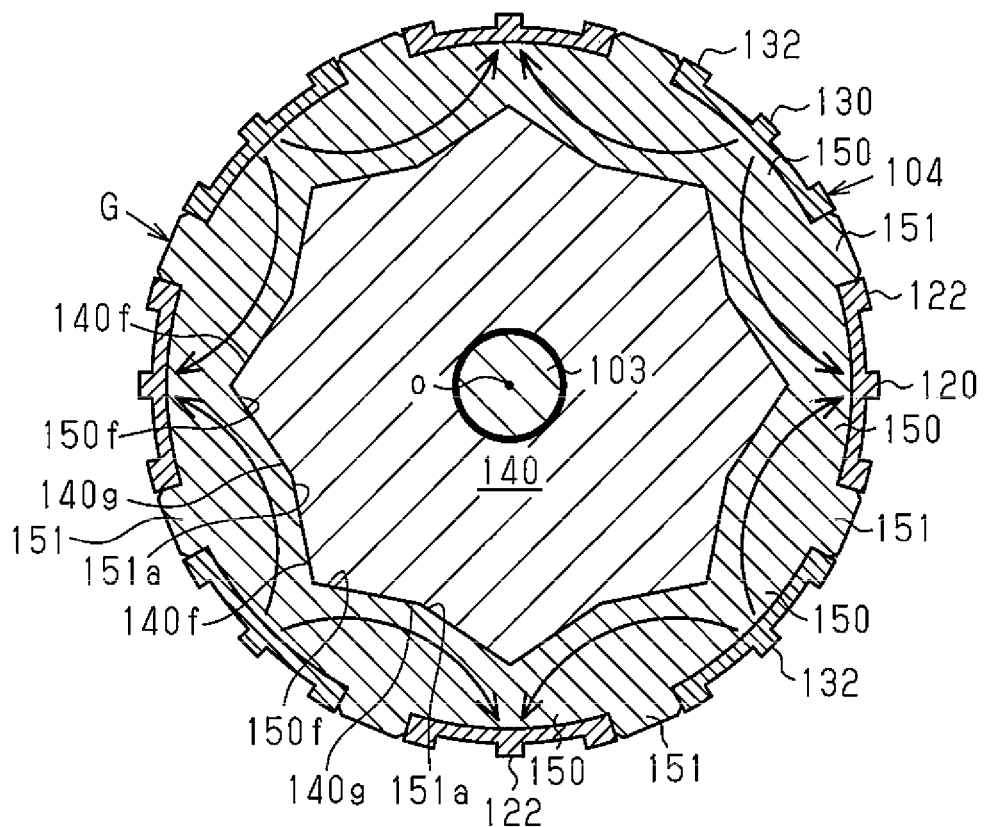
FIG. 23 is a partially cross-sectional view of a rotor in a further example of the third embodiment.

For example, the inner surface of the rectifying magnet G may be shaped as shown in FIG. 23 as viewed in the axial direction. The inner surface of the rectifying magnet G is formed by straight lines connecting a point at the circumferential center of each back surface magnet portion 150 located outward in the radial direction and a point at the circumferential center of each inter-pole magnet portion 151 located inward in the radial direction. In this manner, a recessed portion 150f may be formed in the inner surface of each back surface magnet portion 150 and an inwardly projected portion 151a may be formed in the inner surface of each inter-pole magnet portion 151. In this example, the outer surface of the disk magnet 140 has the same shape as the inner surface of the rectifying magnet F (shape allowing for fitting of inwardly projected portion 151a without any gaps).

This structure also has the same advantages as the third embodiment. Further, in this structure, the inwardly projected portion 151a is formed in the inner surface of the inter-pole magnet portion 151. This allows the rectifying magnet G to have a satisfactory orientation. More specifically, the rectifying magnet G, which reduces leakage flux, is oriented from the outer circumferential surface of a back surface magnet portion 150 to the outer circumferential surface of an adjacent back surface magnet portion 150 (refer to the arrows in FIG. 23), and the inner surface of the inter-pole magnet portion 151 is significantly involved with the orientation (forms magnetic path). Thus, the formation of the inwardly projected portions 151a in the inner surface allows the rectifying magnet G to have satisfactory orientation. This reduces leakage flux in a further favorable manner and allows for a higher output.

Figure 24:
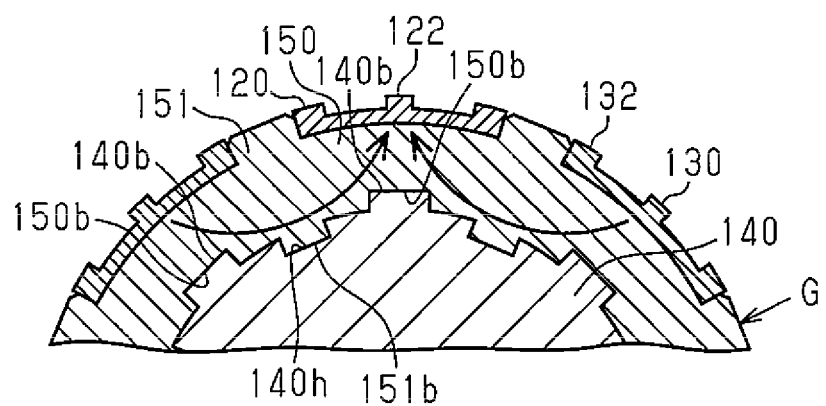
FIG. 24 is a partially cross-sectional view of a rotor in another example of FIG. 19.

The rectifying magnet G of the above example including the rectangular recessed portion 150b (refer to FIG. 19) as viewed in the axial direction may be changed, for example, as shown in FIG. 24. In FIG. 24, a rectangular inwardly projected portion 151b is formed in the inner surface of the inter-pole magnet portion 151. In this example, the disk magnet 140 includes an inwardly recessed portion 140h having the same shape as the inwardly projected portion 151b (shape allowing for fitting of inwardly projected portion 151b without any gaps).

Figure 25:
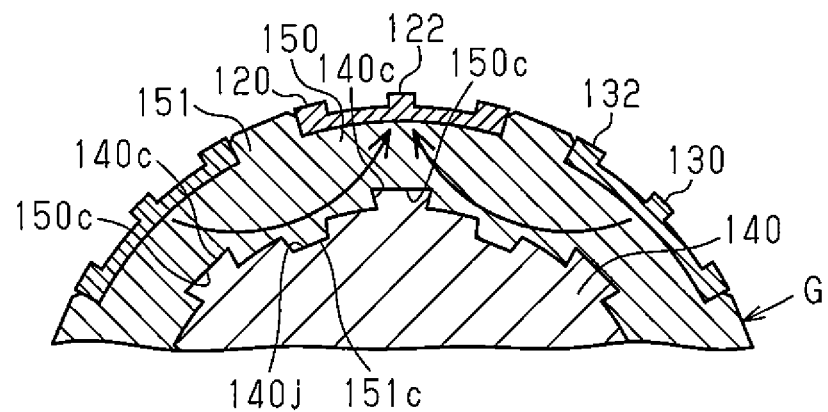
FIG. 25 is a partially cross-sectional view of a rotor in another example of FIG. 20.

The rectifying magnet G of the above example including the trapezoidal recessed portion 150c (refer to FIG. 20) as viewed in the axial direction may be changed, for example, as shown in FIG. 25. In FIG. 25, a trapezoidal inwardly projected portion 151c is formed in the inner surface of the inter-pole magnet portion 151. In this example, the disk magnet 140 includes an inwardly recessed portion 140j having the same shape as the inwardly projected portion 151c (shape allowing for fitting of inwardly projected portion 151c without any gaps).

Figure 26:
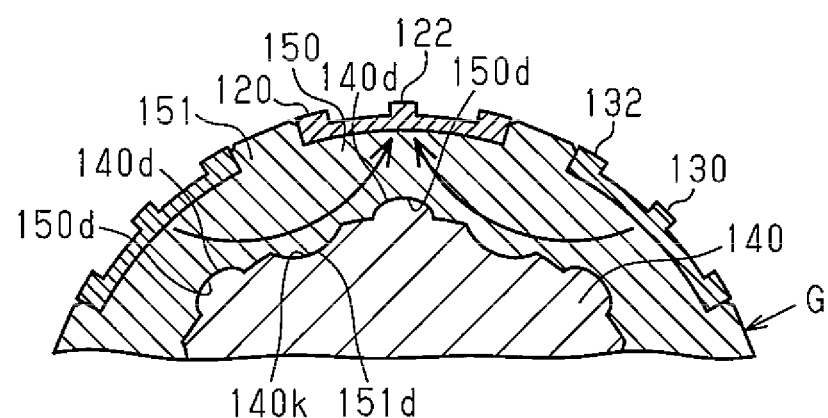
FIG. 26 is a partially cross-sectional view of a rotor in another example of FIG. 21.

The rectifying magnet G of the above example including the curved recessed portion 150d (refer to FIG. 21) as viewed in the axial direction may be changed, for example, as shown in FIG. 26. In FIG. 26, an inwardly projected portion 151d having a curved shape is formed in the inner surface of the inter-pole magnet portion 151. In this example, the disk magnet 140 includes an inwardly recessed portion 140k having the same shape as the inwardly projected portion 151d (shape allowing for fitting of inwardly projected portion 151d without any gaps).

These structures (refer to FIGS. 24 to 26) generally have the same advantage as the above example (refer to FIG. 23). The shape of the recessed portions in the rectifying magnet G and the shape of the inwardly projected portion may be a combination of different shapes.

In the above embodiment, the projected portion 140a is formed to have the same shape as the recessed portion 150a (shape allowing for fitting without any gaps).

Although not particularly mentioned in the above embodiment, the materials and manufacturing methods of the disk magnet 140 and the rectifying magnet G are not particularly limited and various magnets may be used. For example, a ferrite magnet, a samarium-iron nitride magnet, a samarium-cobalt magnet, a neodymium magnet, or an alnico magnet may be used. Further, for example, a sintered magnet or a bond magnet may be used. When using a bond magnet, the bond magnet may be compression-molded or injection molded.

In the above embodiment, the present invention is embodied in the motor M in which the number of poles of the rotor 104 is set to eight and the number of the teeth 111 of the stator 102 is set to twelve. However, the number of poles of the rotor 104 and the number of the teeth 111 of the stator 102 may be changed. For example, the present invention may be embodied in a motor in which the number of poles of the rotor 104 is set to ten, and the number of the teeth 111 of the stator 102 is set to twelve.

The invention claimed is:

1. A rotor comprising:
   first and second rotor cores, each including a generally disk-shaped core base and a plurality of claw-poles, wherein the claw-poles are arranged at equal intervals on an outer circumference of the core base, each of the claw-poles projects toward an outer side in a radial direction and extend in an axial direction, the core bases of the first and second rotor cores are opposed to each other, and the claw-poles of the first and second rotor cores are alternately arranged in a circumferential direction;
   a disk magnet arranged between the core bases in the axial direction, wherein the disk magnet is magnetized in the axial direction so that the claw-poles of the first rotor core function as first poles and the claw-poles of the second rotor core function as second poles; and a rectifying magnet including at least one of an inter-pole magnet portion and a back-surface magnet portion, wherein the inter-pole magnet portion is located in a gap formed in the circumferential direction between the claw-poles of the first rotor core and the claw-poles of the second rotor core, and the back surface magnet portion is located in a gap formed at back surfaces of the claw-poles, wherein the rectifying magnet is magnetized in a direction different from the axial direction, the rectifying magnet and the disk magnet are formed from different materials, and the rectifying magnet is integrated with the disk magnet in a post-process.

2. The rotor according to claim 1, wherein the rectifying magnet is insert-molded with the disk magnet held between the core bases of the first and second rotor cores, and the rectifying magnet is integrated with the disk magnet in the post process.

3. The rotor according to claim 1, wherein the rectifying magnet is a bond magnet.

4. The rotor according to claim 1, wherein the disk magnet is an anisotropic sintered magnet.

5. The rotor according to claim 1, wherein
the rectifying magnet includes both of the back surface magnet portion and the inter-pole magnet portion, and
an orientation direction of the rectifying magnet is a polar anisotropic orientation.

6. The rotor according to claim 1, wherein
the rectifying magnet includes both of the inter-pole magnet portion and the back surface magnet portion,
the back surface magnet portion and the inter-pole magnet portion are integrally formed so that the rectifying magnet is annular,
the inter-pole magnet portion and the back surface magnet portion are magnetized to reduce leakage flux at portions where the inter-pole magnet portion and the back surface magnet portion are located, and
one of an axial end surface of the back surface magnet portion and an axial end surface of the inter-pole magnet portion is a flat surface.

7. A motor comprising:
the rotor according to claim 1; and
a stator that generates a rotational magnet field.

8. A rotor comprising:
first and second rotor cores, each including a generally disk-shaped core base and a plurality of claw-Doles, wherein the claw-poles are arranged at equal intervals on an outer circumference of the core base, each of the claw-poles projects toward an outer side in a radial direction and extend in an axial direction, the core bases of the first and second rotor cores are opposed to each other, and the claw-poles of the first and second rotor cores are alternately arranged in a circumferential direction;
a disk magnet arranged between the core bases in the axial direction, wherein the disk magnet is magnetized in the axial direction so that the claw-poles of the first rotor core function as first poles and the claw-poles of the second rotor core function as second poles; and
a rectifying magnet including an inter-pole magnet portion and a back-surface magnet portion, wherein the inter-pole magnet portion is located in a gap formed in the circumferential direction between the claw-poles of the first rotor core and the claw-poles of the second rotor core, and the back surface magnet portion is located in a gap formed at back surfaces of the claw-poles, wherein the rectifying magnet and the disk magnet are formed from different materials, the rectifying magnet is integrated with the disk magnet in a post-process, the back surface magnet portion and the inter-pole magnet portion are integrally formed so that the rectifying magnet is annular, the inter-pole magnet portion and the back surface magnet portion are magnetized to reduce leakage flux at portions where the inter-pole magnet portion and the back surface magnet portion are located, an inner surface of a circumferentially central section in the back surface magnet portion includes a recessed portion, and the disk magnet includes a projected portion that enters the recessed portion.

9. The rotor according to claim 8, wherein the recessed portion is formed to be deeper as a circumferential center of the back surface magnet portion becomes closer.

10. The rotor according to claim 8, wherein an inner surface of the inter-pole magnet portion includes an inwardly projected portion.

11. The rotor according to claim 8, wherein an inner surface of the rectifying magnet includes a polygonal inner surface that forms the recessed portion.

12. The rotor according to claim 8, wherein the projected portion is formed to have the same shape as the recessed portion.

13. A motor comprising:
the rotor according to claim 8; and
a stator that generates a rotational magnet field.

14. A rotor comprising:
first and second rotor cores, each including a generally disk-shaped core base and a plurality of claw-poles, wherein the claw-poles are arranged at equal intervals on an outer circumference of the core base, each of the claw-poles projects toward an outer side in a radial direction and extend in an axial direction, the core bases of the first and second rotor cores are opposed to each other, and the claw-poles of the first and second rotor cores are alternately arranged in a circumferential direction;
a disk magnet arranged between the core bases in the axial direction, wherein the disk magnet is magnetized in the axial direction so that the claw-poles of the first rotor core function as first poles and the claw-poles of the second rotor core function as second poles; and
a rectifying magnet including an inter-pole magnet portion and a back-surface magnet portion, wherein the inter-pole magnet portion is located in a gap formed in the circumferential direction between the claw-poles of the first rotor core and the claw-poles of the second rotor core, and the back surface magnet portion is located in a gap formed at back surfaces of the claw-poles, wherein the rectifying magnet and the disk magnet are formed from different materials, and the rectifying magnet is integrated with the disk magnet in a post-process, the back surface magnet portion and the inter-pole magnet portion are integrally formed so that the rectifying magnet is annular, the inter-pole magnet portion and the back surface magnet portion are magnetized to reduce leakage flux at portions where the inter-pole magnet portion and the back surface magnet portion are located, and an inner surface of the inter-pole magnet portion includes an inwardly projected portion.

15. A motor comprising:
the rotor according to claim 14; and
a stator that generates a rotational magnet field.

* * * * *